United States Patent

[11] 3,588,232

| [72] | Inventor | Joseph Mostel<br>Brooklyn, N.Y. |
|---|---|---|
| [21] | Appl. No. | 885,133 |
| [22] | Filed | Dec. 15, 1969 |
| [45] | Patented | June 28, 1971 |
| [73] | Assignee | The United States of America as represented by the Secretary of the Navy |

[54] PRECISION ADJUSTABLE ASSEMBLY FOR AN OPTICAL BENCH MARK
4 Claims, 5 Drawing Figs.

[52] U.S. Cl. .................................................. 350/288,
74/89.15, 248/181, 248/487, 350/310
[51] Int. Cl. .................................................. G02b 5/08
[50] Field of Search .......................................... 350/288,
310, 293, 296; 74/89.15, 89, 89.14; 248/181, 487;
33/(Inquired)

[56] References Cited
UNITED STATES PATENTS
| 2,132,172 | 10/1938 | Langsner..................... | 33/72 |
| 3,478,608 | 11/1969 | Met............................ | 350/310X |

*Primary Examiner*—David Schonberg
*Assistant Examiner*—John W. Leonard
*Attorneys*—Richard S. Sciascia, Louis B. Applebaum and Ernest F. Weinberger ABSTRACT: A ring holder rigidly carries an optical mirror and is provided with four 90° spaced apart outwardly extending stub shafts which are each supported for sliding movement in the bushing of a spherical bearing. Said bearings are each held in a yoke which is fixed in a base member and is independently, vertically adjustable by means of a lead screw through the yoke. Means are provided for locking the lead screw to prevent disturbing the mirror after it has been locked. The mirror can be adjusted in two planes while holding the center thereof fixed.

INVENTOR.
JOSEPH MOSTEL

PATENTED JUN28 1971　　　　　　　　　　　3,588,232

INVENTOR.
JOSEPH MOSTEL

BY Ernest F. Weinberger
Lon B. Appleton
ATTORNEYS 3,588,232

PRECISION ADJUSTABLE ASSEMBLY FOR AN OPTICAL BENCH MARK

The invention described herein may be manufactured and used by or for the Government of the United States of America for governmental purposes without the payment of any royalties thereon or therefor.

BACKGROUND OF THE INVENTION

1. Field of the Invention

The present invention relates to optical bench marks and more particularly pertains to precision adjustable supports for the optical mirror of a bench mark wherein the mirror is independently adjustable in two perpendicular planes while the physical center of the mirror surface retains an absolute fixed spacial position.

2. Description of the Prior Art

In the field of adjustable optical bench marks it has been the general practice to support the optical element by four separate butting screws on the bearing surfaces of the element, relying on frictional engagement for rigidity. Further, each screw is individually adjustment and readjustment or compensation is required until the central position thereof is reestablished. Additionally, the reliance on frictional forces results in displacement due to vibrations and shock. Such devices have proved unsatisfactory in that they necessitate periodic compensation and are initially time consuming.

SUMMARY OF THE INVENTION

The general purpose of this invention is to provide a precision adjustable optical bench mark that has all the advantages of similarly employed prior art devices and has none of the above described disadvantages. To attain this, the present invention provides a ring support member for carrying the optical mirror element, which member also carries, for sliding engagement outwardly, four extending stub members whose opposite ends are fixed in spherical bearings. Vertically adjustable (lead screw) yokes carry the bearings while a belleville spring washer is disposed about the stub between the ring and the bearing. A locking screw rigidly fixes the yoke in position so that the mirror can be adjusted in position without disturbing the physical center of the mirror element.

An object of the present invention is to provide an adjustable optical bench mark which in adjustment does not alter its optical physical center.

Another object is to provide a simple, inexpensive, reliable and accurate adjustable optical bench mark.

Other objects and many of the attendant advantages of this invention will be readily appreciated as the same becomes better understood by reference to the following detailed description when considered in connection with accompanying drawings.

DESCRIPTION OF THE PREFERRED EMBODIMENT

Figure 1:
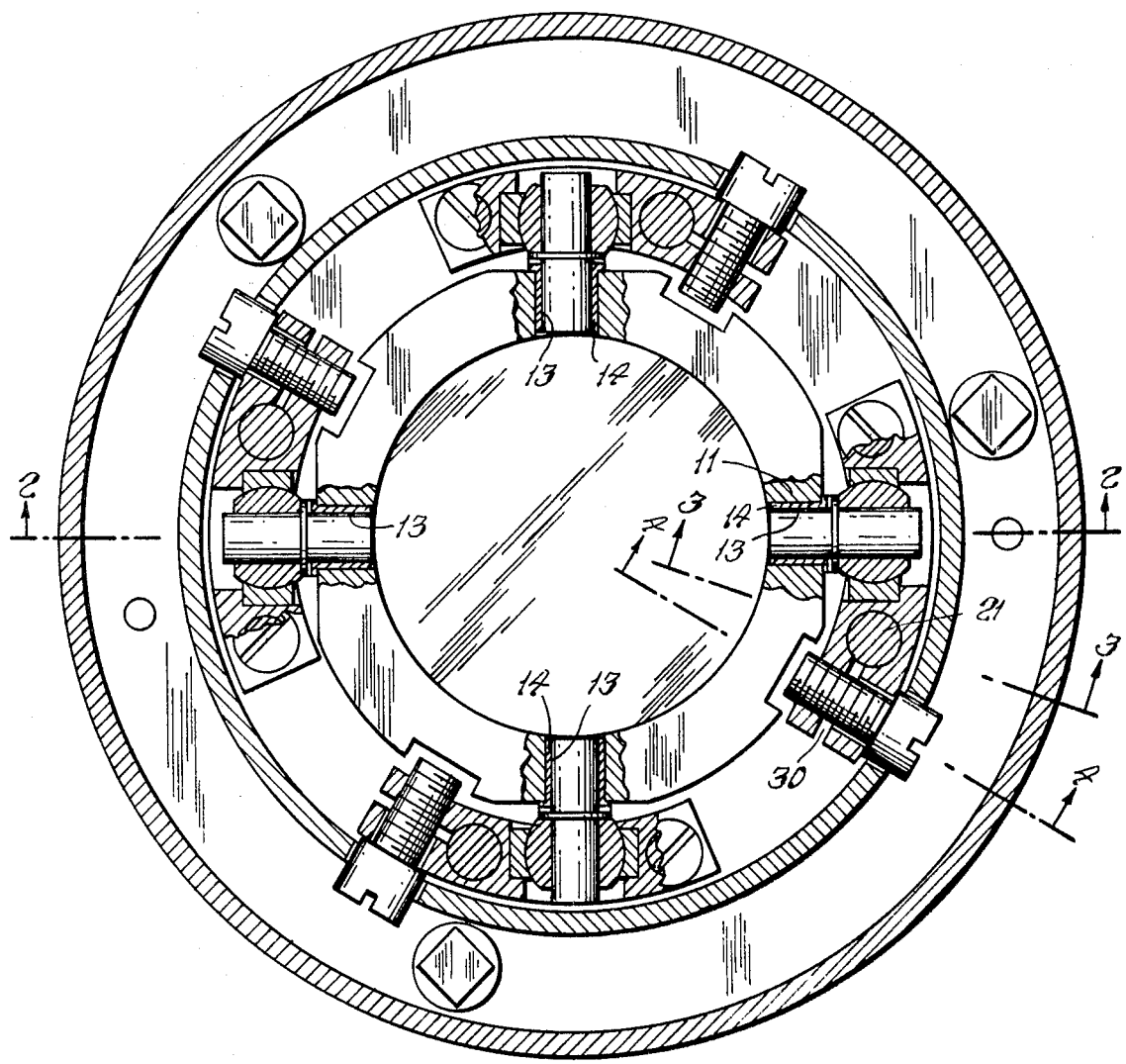
FIG. 1 is a plan view, partly in section, of an embodiment made in accordance with the principle of this invention.
Figure 2:
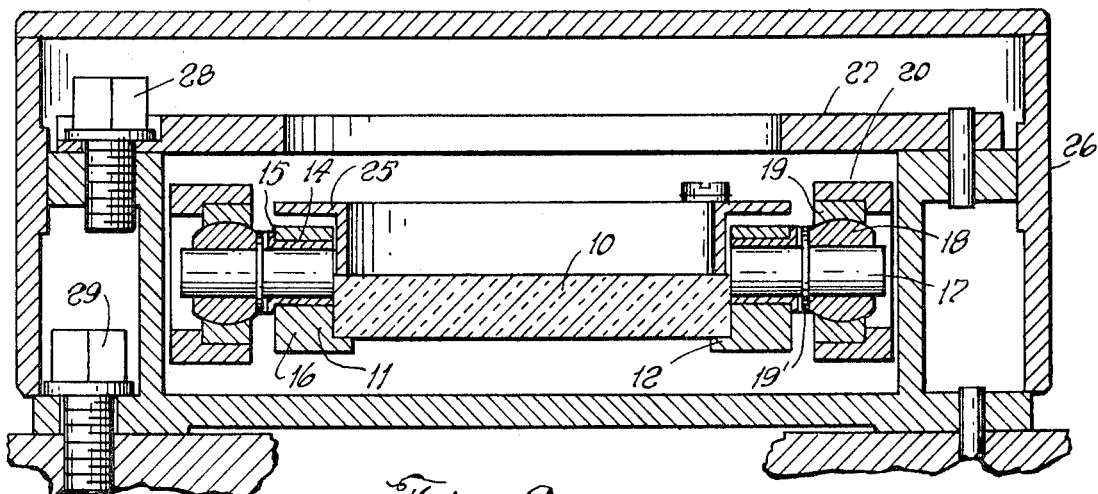
FIG. 2 is a sectional view taken approximately along line 2-2 of FIG. 1.
Figure 3:
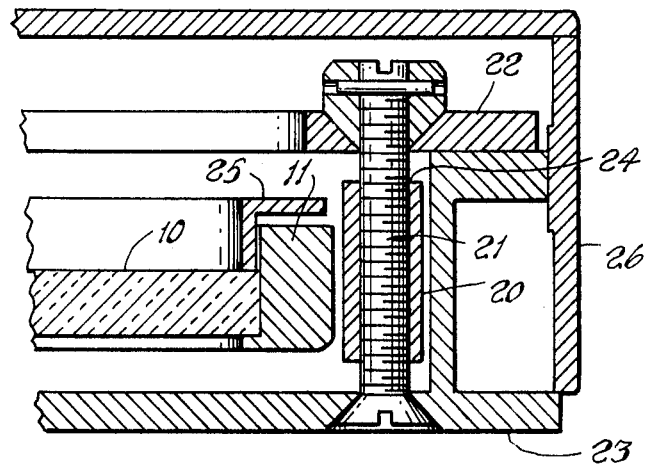
FIG. 3 is a sectional view taken approximately along line 3-3 of FIG. 1.

In the illustrated embodiment of FIGS. 1 and 2 a flat circular optical mirror 10 is supported by a ring member 11 which abuts the mirror circumferentially and allows the mirror to rest on the inwardly extending flange portion 12. The ring 11 is provided with four radial openings 13 spaced at 90° separations, and each having therein a teflon or plastic split shoulder bushing 14 whose flange section 15 abuts the outer wall 16 of the ring 11. Carried within each of the bushings is a stub shaft 17 having a spherical bearing 18 proximate the outwardly extending end of the shaft. The spherical bearing is positioned in a spherical race 19 that in turn is supported by a yoke 20. A belleville spring washer 19' is disposed about the shaft intermediate the bushing flange 15 and the inner edge of the bearing. A yoke is provided for each bearing and is supported for vertical movement by lead screw 21 (see FIG. 3) which extends between the cover 22 and the base 23 and passes through a threaded aperture 24 in the yoke whereby as the screw 21 is rotated the yoke traverses vertically and carries with it the stub shaft and the mirror. An upper hold down ring 25 firmly holds the mirror in the support ring 11 and is affixed to the support ring by screws (not shown) threaded therein.

Figure 5:
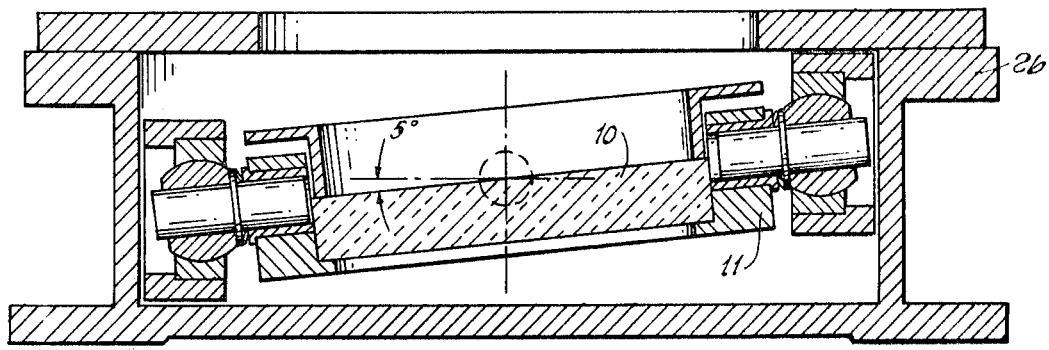
FIG. 5 is a sectional view similar to that of FIG. 2 except that the optical element has been deflected.
Figure 4:
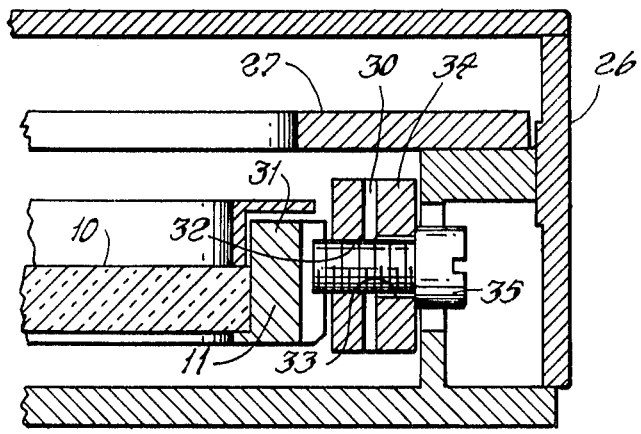
FIG. 4 is a sectional view taken approximately along line 4-4 of FIG. 1.

A housing 26 encloses the above described structure with an opening opposite the mirror to permit direct observation. The housing could be, as shown, fabricated in several separate parts and bolted together as well as to the base 23. An inside cover 27 pinned or bolted as at 28 and 29 to the housing is disposed between the mirror and the upper wall of the housing. The yoke 20 extends past the bearing on both sides and one side thereof it is provided with a vertical extending slit 30. The inside slit portion 31 (see FIG. 4) is provided with a threaded aperture 32 aligned with a slightly larger aperture 33 in portion 34 through which passes locking screw 35. The locking screw 35 effectively forces the yoke to firmly engage the lead screw and lock it into the desired position FIG. 5 illustrates the physical position of the device with the mirror element 10 tilted in one plane through the raising of one yoke and the equal lowering of the opposite yokes by their respective lead screws. As is clear the optical element will tilt about its center line between the two yokes while the action on the other two yokes will be one of rotation on their respective bearings. As the mirror tilts, with ring holder 11, the stub 17 will slide outwardly in the bushing and the bearing while the stub is displaced.

Summarizing the overall operation it is clear that the optical element is mounted on a support ring which in turn is supported in four spherical bearings which are each held in a yoke that rides on a lead screw. The lead screw is secured in the base and cover. The yoke is provide with a slit along the lead screw axis such that a locking screw jambs or releases the yoke and lead screw threads. The mirror is adjusted by loosening the lock screws, turning the opposite lead screws to attain the proper mirror position, while the mirror rotates about its center in the other two bearings. The lead screw threads are then jambed by the locking screw and the operation repeated for the other yokes.

Obviously many modifications and variations the present invention are possible in the light of the above teachings. It is therefore to be understood that within the scope of the appended claims the invention may be practiced otherwise than as specifically described.

I claim:

1. An adjustable optical bench mark assembly for a plane mirror which comprises:

a ring member for peripherally supporting said mirror and having four equally spaced apart radially directed openings in the walls thereof, a stub shaft member slidably carried in a bushing in each of said openings, a spherical bearing disposed on each of said stubs proximate the end of said stub distant from said opening and carried in, a race member encircling each of said bearings for rotary movement of said bearing therein, means for supporting each of said races having lead screw adjustment means providing adjustable vertical movement thereof, whereby said ring and said mirror may be positioned by adjusting opposite lead screw means while permitting rotation of the other of said bearings thus insuring displacement of said mirror about its center.

2. The assembly according to claim 1 further including biasing means disposed intermediate said bushing and said bearing for maintaining a separation therebetween.

3. The assembly according to claim 2 wherein said biasing means is a belleville spring washer disposed about said stub.

4. The assembly according to claim 3 wherein said means for supporting is a yoke member which is provided with means for locking said lead screw adjustment means.